June 4, 1963  R. MÜLLER ETAL  3,092,198
AUTOMATIC WEIGHING SCALE
Filed Jan. 20, 1960  4 Sheets-Sheet 1

INVENTORS
RUDOLF MÜLLER
WALTER SIMM
BY   FRIEDRICH LINSERT
Michael S. Striker
attorney

INVENTORS
RUDOLF MÜLLER
WALTER SIMM
FRIEDRICH LINSERT

June 4, 1963   R. MÜLLER ETAL   3,092,198
AUTOMATIC WEIGHING SCALE

Filed Jan. 20, 1960   4 Sheets-Sheet 3

INVENTORS
RUDOLF MÜLLER
WALTER SIMM
FRIEDRICH LINSERT
BY
Michael S. Striker
Attorney June 4, 1963  R. MÜLLER ETAL  3,092,198
AUTOMATIC WEIGHING SCALE
Filed Jan. 20, 1960  4 Sheets-Sheet 4

INVENTORS
RUDOLF MÜLLER
WALTER SIMM
FRIEDRICH LINSERT
BY

United States Patent Office 3,092,198
Patented June 4, 1963

3,092,198
AUTOMATIC WEIGHING SCALE
Rudolf Müller, Gruenwald, near Munich, Walter Simm, Opladen, and Friedrich Linsert, Dormagen, Germany, assignors to Agfa Aktiengesellschaft, Leverkusen-Bayerwerk, Germany
Filed Jan. 20, 1960, Ser. No. 3,591
Claims priority, application Germany Jan. 22, 1959
3 Claims. (Cl. 177—212)

The present invention relates to weighing scales.

More particularly, the present invention relates to spring balances of the type which are capable of measuring extremely small weights of up to 100 mg. or at the most up to 1000 mg.

Although weighing scales of this general type are known, these weighing scales suffer from several defects. Thus, in the manufacture of various types of articles it is desirable in order to check on the precision with which the articles are manufactured to weigh various components of the articles at various times, and in order to have the greatest possible degree of accuracy in the manufacture of such articles it is desirable to weigh as many test components as possible as often as possible. Thus, it is essential to be able to very rapidly weigh such articles or components which have extremely small weights.

At the present time unavoidable errors are introduced into the determination of such weighs not only because of variations in the manner in which the operator manipulates the scale but also because of errors which are introduced in the simple recording and transferring of the weight values which are indicated by the weighing scale.

It is therefore apparent that in order to eliminate errors of this latter type it is necessary to provide a weighing scale which is fully automatic not only with respect to the weighing itself but also with respect to the recording of the weight which is obtained by the weighing scale. Although there are at the present time scales capable of accomplishing these results, the known scales are extremely complex and expensive and are not as reliable in operation as might be desired.

It is, therefore, a primary object of the present invention to provide a fully automatic weighing scale capable of weighing extremely small weights of up to 100 or up to 1000 mg. and also capable of automatically recording the weight of the article so that in this way the possibility of error is entirely eliminated and an extremely high degree of precision can be obtained in the manufacture of small components.

It is a further object of the present invention to provide a structure capable of accomplishing the above object and at the same time being composed of relatively simple rugged elements which are very reliable in operation.

It is also an object of the present invention to provide a weighing scale of the above type which is arranged in such a way that it is insulated from large or substantial moments or stresses which would otherwise be applied to the weighing scale by devices used with the scale such as the structure used for measuring and recording the weight of the article.

It is also an object of the present invention to provide an automatic weighing scale of the above type which will operate very rapidly to determine the weight of an article so that it is possible that the weighing scale of the invention to measure the weight of an extremely large number of articles in an extremely short period of time all without any error because of the fully automatic operation of the weighing and of the recording of the weight.

The objects of the present invention also include the provision of a weighing scale of the above type which will be influenced to only an extremely small entirely negligible degree by factors such as variation in room temperature.

It is furthermore an object of the present invention to provide a weighing scale of the above type which makes use of an electro-optical means which requires at most only two photo electric cell units.

With the above objects in view the present invention includes in an automatic weighing scale of the type referred to above an elongated balance beam having a predetermined position of rest and a support means supporting the balance beam for turning movement from its position of rest when an article to be weighed is applied to the balance beam. A spring means cooperates with the balance beam to oppose movement of the latter from said rest position thereof and a stressing means cooperates with the spring means for stressing the latter. In accordance with the present invention an electro-optical means cooperates with the beam to sense movement of the latter from said rest position thereof and cooperates with the stressing means to actuate the latter to return the beam to its rest position by stressing the spring means, the extent to which the stressing means operates in order to stress the spring means to return the beam to its rest position giving an indication of the weight of the article.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a fragmentary front elevation showing schematically one possible embodiment of a structure according to the present invention;

FIG. 2 fragmentarily and schematically illustrates the manner in which the electro-optical means of FIG. 1 cooperates with the balance beam of FIG. 1;

Figure 1:
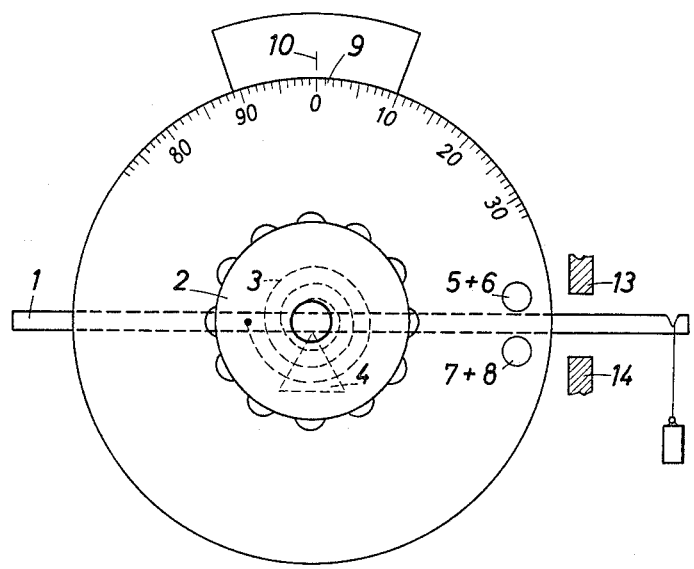
Figure 2:
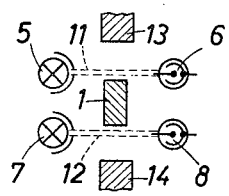

Referring to FIGS. 1 and 2, there is illustrated schematically therein an elongated balance beam 1 which has a predetermined position of rest, the beam 1 being shown in this position of rest in FIGS. 1 and 2. This beam 1 is supported by a support means 4 for turning movement away from its position of rest when a weight to be measured is applied to the beam 1, such a weight being shown schematically at the right hand of the beam 1 in FIG. 1. Thus, the support means 4 is illustrated schematically in FIG. 1 as taking the form of a knife edge located at the center of the beam 1 so as to support the balance beam for turning movement. As is apparent from FIGS. 1 and 2, a pair of stop members 13 and 14 are located in the path of turning of the beam 1 so as to limit turning of the beam 1. Thus, the stop member 13 will limit the turning of the beam 1 in a counter clockwise direction, as viewed in FIG. 1, while the stop 14 will limit turning movement of the beam 1 in a clockwise direction as viewed in FIG. 1, from the rest position of the beam 1 shown in FIG. 1.

An electro-optical means is provided for sensing when the beam 1 moves from its predetermined rest position, and this electro-optical means includes a pair of lamps 5 and 7 which respectively provide the light beams 11 and 12 passing, respectively over and under and close to the upper and lower opposed edges of the beam 1 when the latter is in its rest position, as indicated in FIG. 2 schematically. The light beams 11 and 12 are respectively received by the photo cells 6 and 8 which may be any type of photo responsive means whether of the type in which a voltage is generated by the light or the type in which the resistance of a material varies according to the amount of light received by the same. These photo cells 6 and 8 are connected through suitable unillustrated amplifiers of known construction to a stressing means for stressing the spiral spring 3. The spiral spring 3 is connected at its outer end to the balance beam 1 and at its inner end to the shaft of the motor 2 which is an electrical motor forming the stressing means for stressing the spiral spring 3 in the embodiment of FIG. 1. The connection of the spiral spring 3 to the shaft of the motor 2 as well as to the balance beam 1 is indicated diagrammatically in FIG. 1. Thus, and depending upon whether the beam 11 or the beam 12 is interrupted by the beam 1 upon application of a weight thereto, the photo cells will act through their amplifiers on the motor 2 through a suitable electric circuit to drive the motor 2 in one direction or the other which will cause the shaft of the motor 2 to stress the spring 3 in a direction which will return the balance beam 1 to its rest position shown in FIG. 1, and a disc 9 is fixed to the shaft of the motor 2 in order to turn with this shaft so that the disc 9 will turn with the shaft of the motor 2 through an angle which indicates the extent to which the stressing means or motor 2 has been driven in order to stress the spiral spring 3 for returning the beam 1 to its rest position. As is indicated in FIG. 1 the disc 9 carries a scale which cooperates with a stationary index 10 so that the extent of turning of the motor 2 can be read directly on the scale of the disc 9, and in this way a measure of the weight of the article will be given. Assuming that the beam 1 turns in a clockwise direction from the rest position thereof shown in FIG. 1, the beam 1 will interrupt the light beam 12 and the photo cell 8 may be connected in an electrical circuit which will actuate the motor 2 when the amount of light reaching the photo cell 8 diminishes, so that in this way the motor 2 is actuated to stress the spring 3 for returning the beam 1 to its rest position. Of course, when the weight is removed then the spring 3 will move the beam 1 in a counter clockwise direction, as viewed in FIG. 1, so that it will interrupt the light beam 11, and at this time the photo cell 6 will act through its amplifier and electrical circuit on the motor 2 for causing the latter to turn so as to return all the parts to the zero or rest position.

Figure 3:
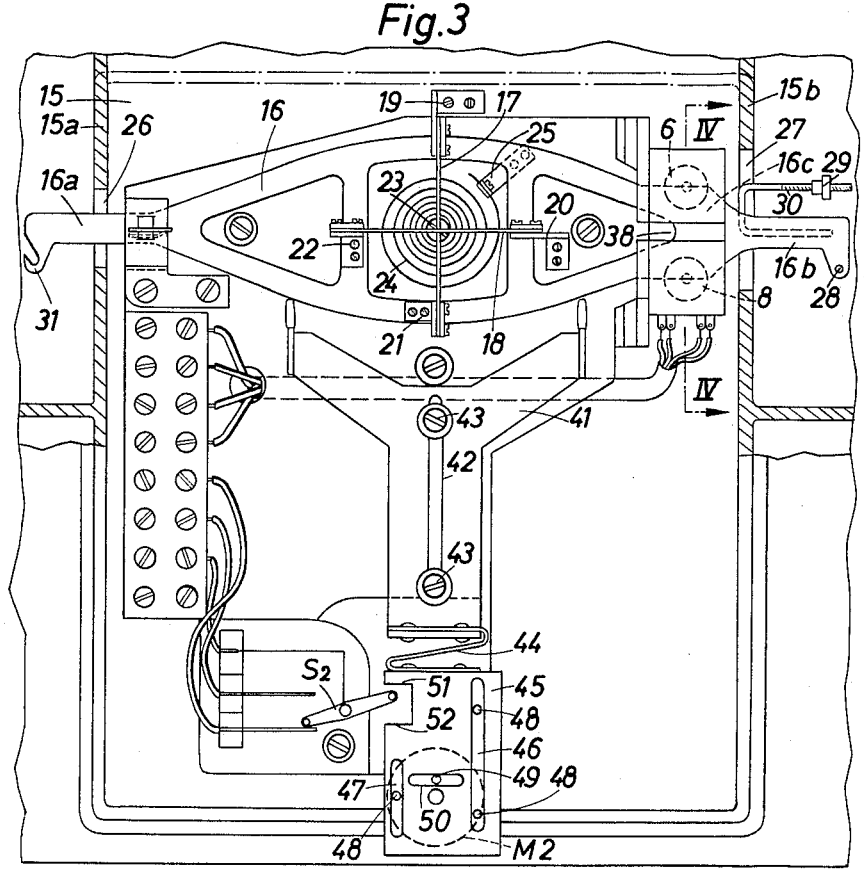
FIG. 3 is a fragmentary and partly sectional elevation of one practical embodiment of a structure according to the present invention.

Referring now to FIG. 3, a housing 15 of the weighing scale is fragmentarily illustrated in FIG. 3. The balance beam 16 is shown in FIG. 3 in its predetermined rest position where this balance beam extends horizontally. The support means for supporting the balance beam for turning movement in the embodiment of FIG. 3 includes a pair of relatively weak leaf springs 17 and 18. These springs 17 and 18 are respectively fixed at one of their ends to the housing 15 by a pair of brackets 19 and 20 which are fixedly carried by the housing 15. The leaf spring 17 extends downwardly from the bracket 19 and is connected at its bottom end by a bracket 21 to the beam 16, so that the leaf spring 17 serves to carry the weight of the beam 16. The leaf spring 18 extends substantially horizontally in the position of the parts shown in FIG. 3, and the end of the leaf spring 18 distant from the bracket 20 is fixed to a bracket 22 which is in turn fixed to the beam 16, and it will be noted that the spring 18 crosses over the spring 17. This arrangement of springs 17 and 18 serves to provide a support means which supports the balance beam 16 for turning movement around the axis of a rotary shaft 23 which is supported in any suitable way for rotation about its own axis which thus coincides with the axis of turning of the balance beam 16, and the spiral spring 24 of the embodiment of FIG. 3 has its inner end connected to the rotary shaft 23 while the outer end of the spiral spring 24 is fixed to a bracket 25 which is in turn fixed to the beam 16 at the side of the latter which is not visible in FIG. 3. The housing 15 includes a pair of side walls 15a and 15b respectively formed with openings through which the elongated end portions 16a and 16b of the beam 16 freely extend. The free end portion 16b of the beam 16 terminates in an eye 28 on which a counterweight can be hung. Small weight differences can be compensated by the slider 29 which can be moved along a horizontal arm 30 carried by the end portion 16b of the beam 16. The article to be weighed is suspended from the end portion 16a of the beam 16 which is provided with a hook 31 for this purpose. In order to adapt the beam 16 so that it can handle articles of widely different types in order to weigh these articles the end portion 16a of the beam 16 is removably connected to the remainder of the beam 16 so that end portions 16a of different constructions may be interchangeably used in order to accommodate articles of widely different types.

Figure 4:
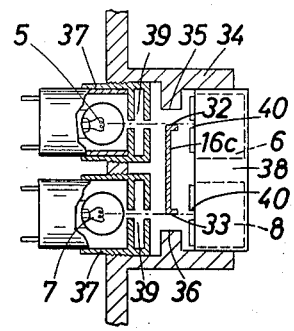
FIG. 4 is a fragmentary section taken along line IV—IV of FIG. 3 in the direction of the arrows.

As is particularly apparent from FIG. 4, the beam 16 is provided adjacent its end portion 16b with a section 16c having a upper and lower parallel edge portions 32 and 33, respectively. This section 16c of the beam 16 extends through a chamber 34 connected to the housing 15 and forming an extension thereof, and this chamber 34 is provided with an upper stop member 35 and a lower stop member 36 which cooperates with the section 16c of the beam 16 to limit the extent to which the latter turns in one direction or the other. The chamber 34 carries at its left end, as viewed in FIG. 4, the pair of lamps 5 and 7 which respectively are the sources of the pair of light beams which cooperate with the beam 16 to sense the movement of the latter from its rest position. Thus, it will be seen that the lamp 5 is accommodated in a lamp housing 37 while the lamp 7 is also accommodated in a second lamp housing 37. On the side of the beam opposite from the lamps 5 to 7 a housing 38 is provided for the pair of photo-responsive devices 6 and 8 which can be either of the type which provides a varying voltage depending on the intensity of the light received by the photo responsive device or which can be of the type which provides a varying resistance depending upon the intensity of the light received by the photo responsive device. The housings 37 are respectively provided with gaps 39 of predetermined size through which light from the lamps 5 and 7 passes so that in this way a pair of light beams of predetermined cross-section respectively extend across the edges 32 and 33 of the beam 16, and the housing 38 is provided with cooperating gaps 40 which respectively receive these light beams as they pass through the gaps 40 to the photo cells or the like 6 and 8. The light beams will reach the photo cells only to the extent that these light beams are not interrupted by the section 16c of the beam 16. In the rest position of the beam 16 which is illustrated in FIG. 4, the parts are symmetrically arranged with respect to each other in such a way that the edge 32 interrupts half of the light beam issuing from the lamp 5 and the edge 33 interrupts half of the light beam issuing from the lamp 7 so that in the position of rest of the balance beam 16 only one-half of the pair of light beams issuing from the lamps 5 and 7 respectively reach the photo cells 6 and 8. Thus, it will be seen that the distance between the centers of the gaps 39 in a vertical direction as well as the distance between the centers of the gaps 40 in a vertical direction is equal to the distance between the upper and lower edges 32 and 33 of the section 16c of the beam 16. As will be apparent from the description which follows, the amount of light reaching the photo cells 6 and 8 when the beam 16 is in the position of FIGS. 3 and 4, which is the rest position of the beam 16, does not suffice to set into operation the control structure which is controlled from the cells 6 and 8. If desired, the accuracy of the weighing scale can be adjusted by providing a structure which will regulate the distance between the lamps 5 and 7 on the one hand and the cells 6 and 8 on the other hand.

An arresting means is provided to maintain the beam 16 in its position of rest until this arresting means is moved to an inoperative position, and in the construction shown in FIG. 3 this arresting means takes the form of an arresting fork 41 formed with a slot 42 through which stationary pins 43 extend so that in this way the arresting fork 41 is guided for vertical movement to and from the arresting position of the fork 41 which is illustrated in FIG. 3. The bottom end of the arresting fork 41 is connected to the top end of a leaf spring 44 whose bottom end is connected to the top end of a plate 45 formed with slots 46 and 47 parallel to the slot 42 and through which stationary pins 48 extend in the manner shown in FIG. 3, so that in this way the plate 45 is guided for a vertical movement. A motor M2 has a drive shaft to which an operating pin 49 is fixed at a given distance from the axis of the drive shaft so that the pin 49 is accentrically mounted for rotation around the axis of the drive shaft of the motor M2, and this operating pin 49 extends into a horizontal slot 50 of the plate 45 which is guided only for vertical movement, so that during operation of the motor M2 the plate 45 will of course be moved up or down. The plate 45 is formed adjacent its left upper end, as viewed in FIG. 3, with a notch having an upper edge 51 and a lower edge 52, these edges forming stop edges which cooperate with the switch $S_2$. When the operating pin 49 has been turned by the motor M2 through approximately 180° the arresting fork 41 will have been lowered to its inoperative position releasing the balance beam 16 for turning movement, and at the same time the stop edge 51 will have engaged the right end of the switch member $S_2$ in order to turn the latter to open the circuit to the motor M2 so that the latter will stop operating and the fork 41 will remain in its lower inoperative position. When the motor M2 is again energized the pin 49 will return to the position shown in FIG. 3 after turning again to 180° and the motor M2 will now cause the edge 52 to actuate the switch $S_2$ in order to again turn off the motor M2, so that with this arrangement the motor M2 is driven each time through 180° in order to move the arresting fork 41 from its operating position shown in FIG. 3 to an inoperative position and then back to its operating position.

Figure 5:
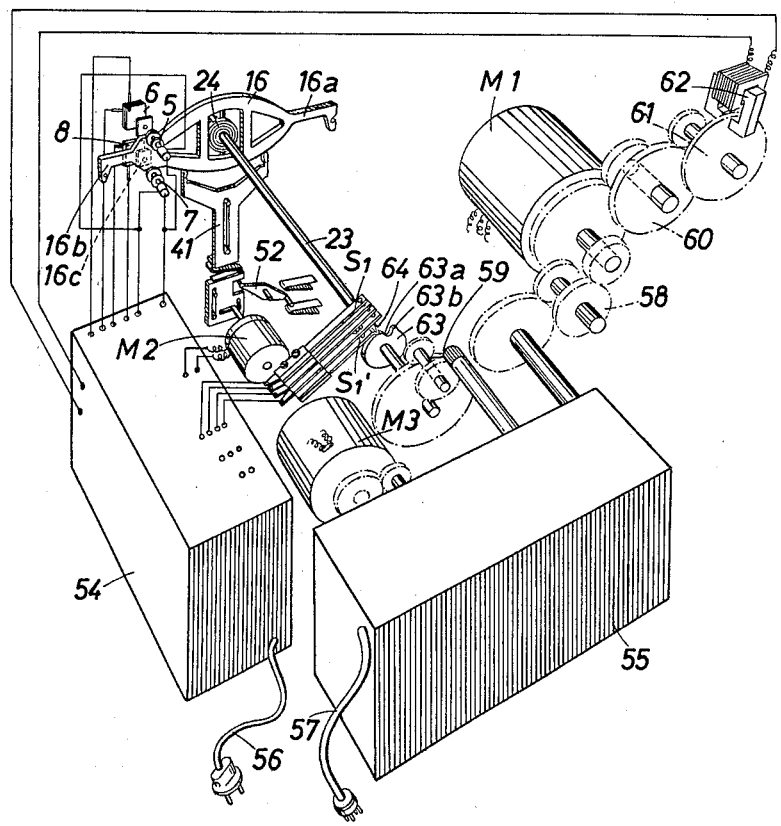
FIG. 5 is a perspective illustration of the mechanism used in connection with the structure of FIG. 3.

Referring to the schematic perspective illustration of the structure shown in FIG. 5, an electrical unit 54 of the electrical control structure is shown therein, this unit 54 including amplifiers, relays, etc. as described below in connection with FIG. 6. A second unit 55 is provided, and this unit 55 includes a counting means and a printing means or a registering means for printing or registering the values counted by the counting means. These devices are of a well known construction. As is also shown in FIG. 5, the structure includes a motor means M1, this motor means forming the main electrical motor which is used as a source of power for turning the rotary shaft 23 through a transmission described below for the purpose of stressing the spiral spring 24, so that this motor means $M_1$ together with the transmission means and the rotary shaft 23 forms the stressing means used to stress the spring 24 in a manner described below. A pair of electrical cords 56 and 57 with suitable plugs extend from the units 54 and 55 and are connected to a device which is used, for example, in order to punch cards with values indicating the weight of the various articles which can be weighed in rapid succession with the structure of the invention.

The motor M1 drives a first transmission 58 which is a step-down transmission and which extends into the unit 55 for driving the counting structure located within the unit 55, and this counting structure is in turn connected to a transmission 59 which is a second step-down transmission and which is connected directly to the rotary shaft 23 for turning the latter. The motor M1 also drives a step-up transmission 60 which rotates a copper disc 61 of an eddy-current brake means which includes the braking electromagnet 62, so that in this way a conventional eddy-current brake 61, 62 is provided for retarding the speed of rotation of the motor M1 when the eddy-current brake is energized.

As may be seen from FIG. 5, the shaft 23 fixedly carries a disc 63 for rotation therewith. This disc 63 is formed with a notch 63a and with a camming projection 63b. This notch and projection serve to control, for safety purposes only, a switch unit 64 in which a pair of switches S1 and S1' are included. The disc 63 cooperates with the switch assembly 64 for the purpose of preventing overloading of the spring 24. As is apparent from the description below, the switches S1 and S1' are connected in circuit with the motor M1 in order to turn the latter in one direction or the other depending upon which of these switches is closed. After the shaft 23 together with disc 63 turns through an angle of approximately 160° from a given central starting position, the unit 64 will first fall into the notch 63a so as to cause the switch S1 to open in order to stop the motor M1 if it happens that the switch S1 has been closed in order to actuate the motor M1. If the motor M1 continues to operate then the unit 64 will ride up the projection 63b which acts on the unit 64 in order to open the switch S1', and thus this latter switch will be opened so that irrespective of which of these switches is closed the drive to the motor M1 will stop and it will only be possible to operate the motor M1 in a reverse direction so that overloading of the spring 24 is reliably prevented with the disc 63.

Figure 6:
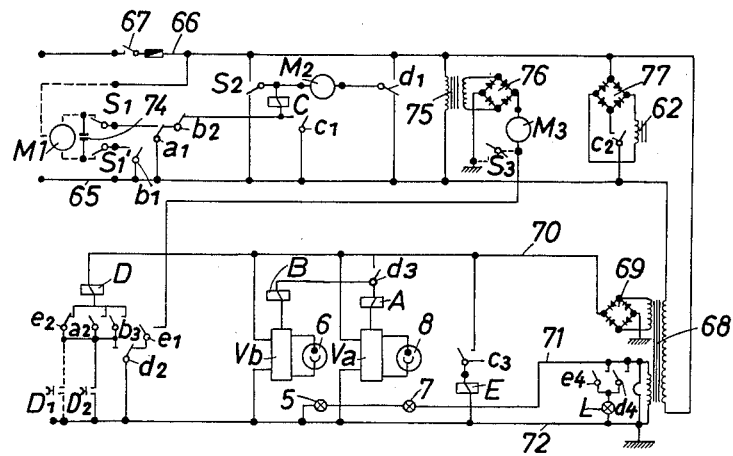
FIG. 6 is a wiring diagram of the electrical structure used with the embodiment of FIGS. 3 and 5.

Referring to the wiring diagram of FIG. 6 it will be seen that the structure includes a pair of conductors 65 and 66 which are connected to the lines so as to be supplied with alternating current. In the line 66 is included a main switch 67 which is used to start and stop the entire weighing structure. The lines 65 and 66 are connected to a transformer 68 which has a pair of secondary coils one of which has its current converted into direct current through the rectifier 69 so that the line 70 is provided with direct current, and the line 71 from the other secondary coil of the transformer 68 has alternating current. The secondary coil which supplies the line 71 with alternating current is also connected with a line 72 which is grounded. The lamps 5 and 7 are connected into the circuit between the lines 71 and 72 so that these lamps 5 and 7 are always illuminated as long as the switch 67 is closed. The structure includes a further lamp L shown at the lower right hand corner of FIG. 6, this lamp L serving as an indicating lamp to indicate to the operator that the weighing scale is carrying out a weighing operation. As will be pointed out below when a weighing operation starts the lamp L becomes illuminated and it is not extinguished until the end of the weighing operation.

Between the lines 70 and 72 are connected the photo cells 6 and 8 which are respectively connected with amplifiers $V_b$ and $V_a$. It is through these amplifiers that the photo cells 6 and 8 actuate the relays B and A, respectively. Furthermore, a relay E is connected between the lines 70 and 72, this relay being of a well-known type which has its energizing and its de-energizing delayed for a given period of time, and in addition there is a relay D which is connected between the lines 70 and 72. The relay D is controlled over various relay contacts, a hand operated switch D2 and a second remote control switch D1 which is in parallel with the switch D2 and which may be used alternately with the switch D2 depending upon the operating conditions.

The motor M1 has three connections. One of these connections is permanently connected with the line 66, while the other two connections are respectively connected through the switches S1 and S1' to the line 65.

Thus, as may be seen from the upper left portion of FIG. 6, the switch $b1$ when closed will connect the motor M1 to the line 65 through the switch S1', when the latter switch is closed, and the switch $a1$ when turned to the left from the position thereof as shown in FIG. 6 will connect the motor M1 to the line 65 through the switch S1 when the latter switch is closed. A condenser 74 is connected into the circuit of the motor M1 in the manner shown in FIG. 6, so that irrespective of which of the switches S1 or S1' is closed to energize the motor M1, the condenser 74 will produce a phase shift of approximately 90° so that when the other of the switches is closed the direction of rotation of the motor M1 will be reversed.

The motor M2 which operates the arresting means in the manner described above is shown at the upper central portion of FIG. 6 and the switch S2 which cooperates with the motor M2 is illustrated in FIG. 6. As is shown in FIG. 6 the motor M2 is connected between the lines 65 and 66 through the switch S2 and the switch $d1$.

The motor M3, on the other hand, is driven through the transformer 75 connected between the lines 65 and 66, this transformer being connected to a rectifier 76 for driving the motor M3 with direct current. The motor M3 is connected through the rectifier 76 and the transformer 75 to the line 66 and through the switches $e1$ and $d2$ to the line 72 so that when the switches $e1$ and $d2$ are both closed the motor M3 will operate. A hand switch S3 is connected to the motor M3 and is grounded so that at any time the hand switch S3 may be manually closed for manually actuating the motor M3 as desired.

The eddy-current brake 62 receives direct current from the lines 65 and 66 through a rectifier 77 which is set into operation upon closing of the switch $c2$.

As was pointed out above, the light reaching the photo cells 6 and 8 when the balance beam 16 is in its position of rest is insufficient to cause the relays B and A to become energized. The range of this central zone where both of the relays A and B are unenergized determines, therefore, among other factors the accuracy of the scale. Therefore, this accuracy can be regulated by regulating the amplification ratio of the amplifiers V$a$ and V$b$.

Referring to the lower left portion of FIG. 6 it will be seen that between the parallel-connected manually operable switches D1 and D2 and the relay D are located a series of switches $e2$, $a2$, and $b3$ for a purpose described below, and also as may be seen from FIG. 6 the relay E will be energized only when the switch $c3$ is closed. As is apparent from the lower right hand portion of FIG. 6, the lamp L will be illuminated when either of the switches $e4$ and $d4$ are closed.

Of course, it is to be understood that when the relay A is energized, then the switches $a1$ and $a2$ will be actuated, while when the relay B is energized the switches $b1$—$b3$ will be energized, when the relay C is energized the switches $c1$—$c3$ will be energized, when the relay D is energized the switches $d1$—$d4$ will be actuated, and when the relay E is energized the switches $e1$—$e4$ will be actuated. All of the parts are illustrated in FIG. 6 in the position they take when all of relays are unenergized and the switch 67 is open, and it will be noted that most of the switches are open when their relays are unenergized. However, the switch $e2$ is a normally closed switch, while switches such as $a1$, S2, and $d1$ move from one closed position to another closed position, these switches being in the illustrated positions when their relays are unenergized, with the exception of the switch S2 which is of course actuated by the motor M2 in the manner described above.

Of course, when an article is to be weighed, this article will most often be heavy enough to turn the balance beam 16 in a counter clockwise direction, as viewed in FIG. 3, so that the section $16c$ will move upwardly, as viewed in FIGS. 3 and 4, with the result that the amount of light reaching the photocell 6 will be diminished and entirely cut off while the amount of light reaching the photocell 8 will increase, and as a result assuming that the switch $d3$ of FIG. 6 is closed, the relay A will become energized when the balance beam 16 turns under the influence of the article hanging from the hook 31. Thus, the relays A and B are set to become energized when the amount of light respectively reaching the photocells 8 and 6 increases.

Assuming that an article to be weighed is suspended from the hook 31, the operator first depresses either of the switches D1 or D2 in order to start the weighing operation. Irrespective of which of the switches D1 or D2 is closed by the operator, the relay D will be energized through the normally closed switch $e2$, and the energizing of the relay D will cause the switch $d2$ to shift to the left, as viewed in FIG. 6, so as to maintain the relay D energized after the manually operated switch D1 or D2 opens after being released by the operator. The switch $d1$ will also move upwardly, as viewed in FIG. 6, upon energizing the relay D so that the motor M2 will become energized and will turn through one-half a revolution in order to move the arresting fork 41 away from the balance beam, and at the end of this half revolution of the motor the switch S2 will of course be moved by the plate 45 so as to open the circuit of the motor M2 and at this time the switch S2 will be in its upper position, as viewed in FIG. 6 connecting the motor M2 to the line 66. It will be noted that with the switch S2 in this upper position, stopping the operation of the motor M2, a circuit is not yet closed to the relay C because the relay C is of the delay type, as is the case with the relay E as described above, and at least one of the switches $b2$ and $a1$ has opened before relay C is energized. It will be seen that in addition to the switches $d1$ and $d2$ which are operated by the energizing of the relay D in the manner described above, the switch $d3$ will be closed so that the relay A or the relay B respectively which is prepared for energizing will now become energized since with e.g. the upward movement of the section $16c$ there is sufficient light reaching the photocell 8 to energize the relay A, and thus the switch $a1$ will move to the left, as viewed in FIG. 6, so as to close the circuit to the motor M1 through the switch S1 so that the motor M1 now starts to turn, in addition, the switch $a2$ closes also. Furthermore, upon energizing of the relay D the switch $d4$ was closed so that the lamp L is illuminated at the very start of the operation.

The parts now continue to operate with the motor M acting through the transmission 58 on the counter within the unit 55 and through the counter and the transmission 59 on the shaft 23 to stress the spiral spring 24 in a direction which will move the beam 16 in a clockwise direction, as viewed in FIG. 3, so that the shaft 23 turns in a clockwise direction, as viewed in FIG. 3. This operation continues until the beam 16 moves back to and beyond its rest position shown in FIG. 3. This type of operation is provided in order to be able to measure the weight of the article in an extremely short time. A considerably greater amount of time would be required to measure the weight of the article if the beam 16 was simply brought back down to its rest position without moving through and beyond its rest position. However, by providing a structure which will stress the spring 24 to an extent which will cause the beam 16 to move down through its rest position the parts can operate much more rapidly.

Of course, this downward movement of the section $16c$ of the beam 16 will cut off the light reaching the photocell 8 and will increase the light reaching the photocell 6. As a result the relay A will become unenergized as soon as the section $16c$ reaches the rest position thereof shown in FIG. 4. Thus, at this instant the switch $a1$ as well as the switch $a2$ return to their positions indicated in FIG. 6, and with the return of the switch $a1$ to the position thereof shown in FIG. 6, the relay C will become energized, and thus the holding switch $c1$ will be closed in order to maintain the relay C energized even after opening of the switch b2 as described below. In addition the energizing of the relay C will result in closing of the switch c2 so that at this moment when the section 16c of the beam 16 has moved somewhat down from the position thereof shown in FIG. 4, the eddy-current brake 62 will become energized and the speed of operation of the motor M1 will be greatly reduced so that the structure now operates to slowly return the beam 16 to its rest position as described below.

In addition to the closing of the switches c1 and c2, the energizing of the relay C closes the switch c3 so that now the relay E becomes energized with the result that the switch e2 will open, the relay C remaining energized through its switch c1, as described above. In addition, the switch e4 will close, the switch d4 remaining closed at this time. Therefore, with the structure of the invention as soon as the balance beam first returns to and then moves beyond its rest position the eddy-current brake will be energized and also the relay B will become energized and the switch b3 will close to maintain the relay D energized even through the switch e2 opens upon energizing of relay E. The switch a2 functions in the same manner as the switch b3, i.e. when in the first weighing period the relay B is energized instead of relay A then switch a2 is closed during the second weighing period, and relay D remains closed after switch e2 has opened. Of course, with the energizing of the relay B the switch b1 closes so that now the motor M1 is driven through the switch S1' in a direction opposite from the direction of rotation of the motor M1 through the switch S1, and thus the balance beam is now returned to its rest position the structure operating slowly as a result of the braking force derived from the eddy-current brake 62. It will be noted that at this time the switch e1 has closed so that the motor M3 is set for operation but does not operate because the switch d2 has not yet returned to the position shown in FIG. 6 due to the fact that the relay D still remains energized.

When the balance beam now reaches its rest position for the second time, the light reaching the photocell 6 will of course diminish and the relay B will become unenergized with the result that the switch b3 will open and thus at this time the relay D will become unenergized. As a result the switch d1 will return to the position shown in FIG. 6 and the motor M2 will again become energized so as to return the arresting fork 41 to its operatiang position shown in FIG. 3 and so as to de-energize the relay C, the switch S2 returning to the position shown in FIG. 6. Also, the switch d4 will open, but the lamp L will remain energized because the switch e4 remains closed. As was pointed out above, the relay E is a delayed type of relay so that even though the relay C becomes unenergized, the relay E remains energized for a predetermined period of time, and thus the lamp L will remain illuminated. It is during this delay from the time when the switch b3 opens to de-energize the relay D until the relay E becomes de-energized that the motor M3 operates in order to cause the mechanism of FIG. 5 to punch in a suitable card holes which will indicate the weight of the article. During this relatively short period of time after de-energizing of D but before de-energizing of the relay E the switch d2 is closed and the switch e1 is also closed, so that the motor M3 will operate for the desired period of time. After this operation of the motor M3, the switch e1 will open and also the switch e4 will open so as to extinguish the lamp L and the operation is completed, all the parts having returned to the position shown in FIG. 6.

Of course, the structure can be set to operate with a diminishing of the light reaching the photocells rather than an increase in the light reaching the photocells. Also, instead of photocells, it is possible to use any other type of photo responsive device. Furthermore, instead of a pair of edges 32 and 33 on the balance beam to cooperate with a pair of light beams, a single opening may be provided, and in this event it is possible to operate the entire structure with a single lamp and a single photo-responsive means. The eddy-current brake structure can be replaced by any desired braking structure which should of course be electrically controlled.

The above-described structure has the great advantage of not being influenced by the moments or other stresses derived from mechanical registering devices, potentiometers, tens switches, printing devices, and the like, since any forces or moments are not transferred back to the structure. Also, it will be noted that the structure of the invention has a high stability, reliability of operation, is influenced to an extremely small degree by room temperature, and will very speedily measure the weight of an article. All of the desired operations are obtained with the use of only two photocells.

It will be understood that each of the elements described above, or two or more together, may also find a useful application in other types of weighing scales differing from the types described above.

While the invention has been illustrated and described as embodied in fully automatic and recording weighing scales for extremely small weights, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In an automatic weighing scale, in combination, an elongated balance beam having a predetermined position of rest; support means supporting said beam for movement from said position of rest thereof when an article to be weighed is applied to said balance beam; spring means cooperating with said balance beam for opposing said movement of the latter from said rest position thereof; stressing means cooperating with said spring means for stressing the latter; electro-optical means sensing movement of said beam from said rest position thereof and controlling said stressing means to operate the latter for stressing said spring means in one direction to return said beam toward said rest position thereof and to move said beam through and beyond said rest position thereof and to then cause said stressing means to operate in a reverse direction to bring said beam back to said rest position thereof; speed reducing means cooperating with said stressing means for reducing the speed with which the latter acts on said spring means; and means cooperating with said sensing means actuating said speed reducing means after said beam returns for the first time toward and moves through and beyond said rest position thereof.

2. In an automatic weighing scale, in combination, an elongated balance beam having a predetermined position of rest; support means supporting said beam for movement from said position of rest thereof when an article to be weighed is applied to said balance beam; spring means cooperating with said balance beam for opposing said movement of the latter from said rest position thereof; motor means cooperating with said spring means for stressing the latter; sensing means out of physical contact with said balance beam for sensing the movement of said beam from said rest position thereof and for controlling said motor means to operate the latter for stressing said spring means first in one direction to return said beam to said rest position and to move said beam through and beyond said rest position thereof and then in opposite direction to cause said spring means to operate in a reverse direction to bring said beam back to said rest position thereof; speed reducing means cooperating with said motor means for reducing the speed with which the latter acts on said spring means; and means cooperating with said sensing means for actuating said speed reducing means after said beam returns for the first time toward and moves through and beyond said rest position thereof.

3. In an automatic weighing scale, in combination, an elongated balance beam having a predetermined position of rest; support means supporting said beam for movement from said position of rest thereof when an article to be weighed is applied to said balance beam; a spiral spring connected at one end to said balance beam; a rotary shaft connected to the other end of said spiral spring; an electric motor; a step-down transmission driven by said electric motor and operatively connected to said rotary shaft for turning the latter to stress said spiral spring; a step-up transmission also connected to said electric motor to be driven thereby; an eddy-current brake means driven by and cooperating with said step-up transmission for reducing, when energized, the speed of operation of said motor; sensing means cooperating with said beam for sensing the movement of the latter from said rest position thereof and cooperating with said electric motor to operate the latter for stressing said spiral spring first in one direction to return said beam to said rest position and to move said beam through and beyond said rest position thereof and then in opposite direction to cause said spiral spring to operate in a reverse direction to bring said beam back to said rest position thereof; and means cooperating with said sensing means for energizing said eddy-current brake means after said beam returns for the first time toward and moves through and beyond said rest position and for de-energizing the electric motor when said beam is brought back to said rest position.

References Cited in the file of this patent

UNITED STATES PATENTS

| | | |
|---|---|---|
| 2,622,868 | Yeasting | Dec. 23, 1952 |
| 2,858,124 | Allen et al. | Oct. 28, 1958 |

FOREIGN PATENTS

| | | |
|---|---|---|
| 202,706 | Australia | Aug. 11, 1955 |
| 816,908 | France | May 10, 1937 |
| 898,689 | Germany | Dec. 3, 1953 |
| 350,590 | Great Britain | June 18, 1931 |